No. 622,439. Patented Apr. 4, 1899.
A. BERGSTRÖM.
FILTER OR STRAINER.
(Application filed Dec. 21, 1898.)
(No Model.) 2 Sheets—Sheet 1.

WITNESSES:

INVENTOR
Albert Bergström
BY
Henry Connett
ATTORNEY

No. 622,439. Patented Apr. 4, 1899.
A. BERGSTRÖM.
FILTER OR STRAINER.
(Application filed Dec. 21, 1898.)
(No Model.) 2 Sheets—Sheet 2.
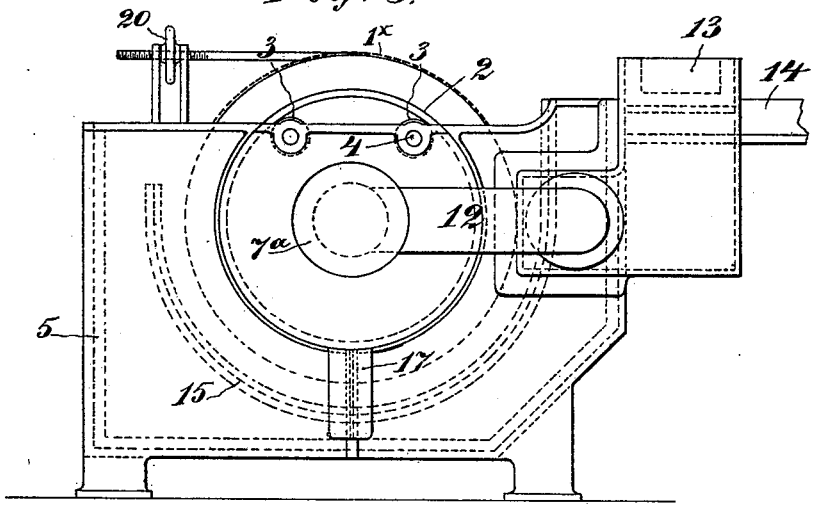
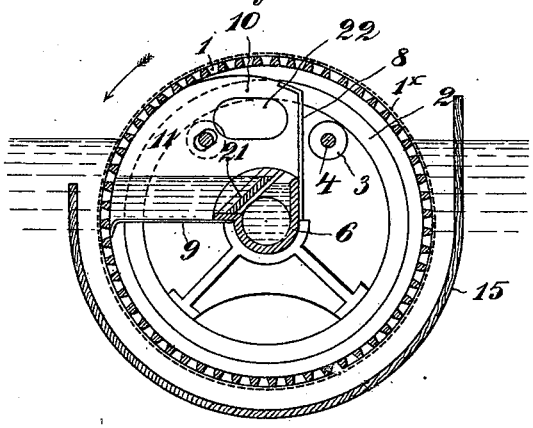
WITNESSES:
J. W. Kliman
Peter N. Ross
INVENTOR
Albert Bergström
BY
Henry Connett
ATTORNEY

UNITED STATES PATENT OFFICE.

ALBERT BERGSTRÖM, OF BOSJÖN, FINSHYTTAN, SWEDEN.

FILTER OR STRAINER.

SPECIFICATION forming part of Letters Patent No. 622,439, dated April 4, 1899.

Application filed December 21, 1898. Serial No. 699,900. (No model.)

*To all whom it may concern:*

Be it known that I, ALBERT BERGSTRÖM, a subject of the King of Sweden and Norway, and a resident of Bosjön, Finshyttan, Sweden, have invented certain new and useful Improvements in Filters or Strainers, of which the following is a specification.

This invention relates to rotary filtering or straining apparatus for removing pulp fiber from the waste water of pulp-factories and paper-mills. Hitherto in this class of strainers or filters used for removing the flotant fibers, &c., that accompany the washing or irrigating water the pulp fiber which passes through the strainer has been lost; and the object of the present invention is to so construct the apparatus that the fiber flotant in the waste water will be recovered and the water will pass off free from all solid matter.

It is well understood by those skilled in the art that many inconveniences arise from the failure to remove all the fiber from the water, besides the not inconsiderable loss of fiber. The presence of the fiber and other solid matters fouls the body of water into which the waste washing water flows and injures it for other uses.

In order to overcome the defects and inconveniences existing in the strainers or filters in common use, the apparatus of the present application is so constructed as to refilter the surface portion of the water which must pass through the foraminous surface of the filtering-cylinder before the latter becomes coated with fiber, and only this portion, such portion which still carries some fiber, being withdrawn from the straining or filtering cylinder and submitted to further filtering.

The accompanying drawings illustrate an embodiment of the invention.

Figure 1:
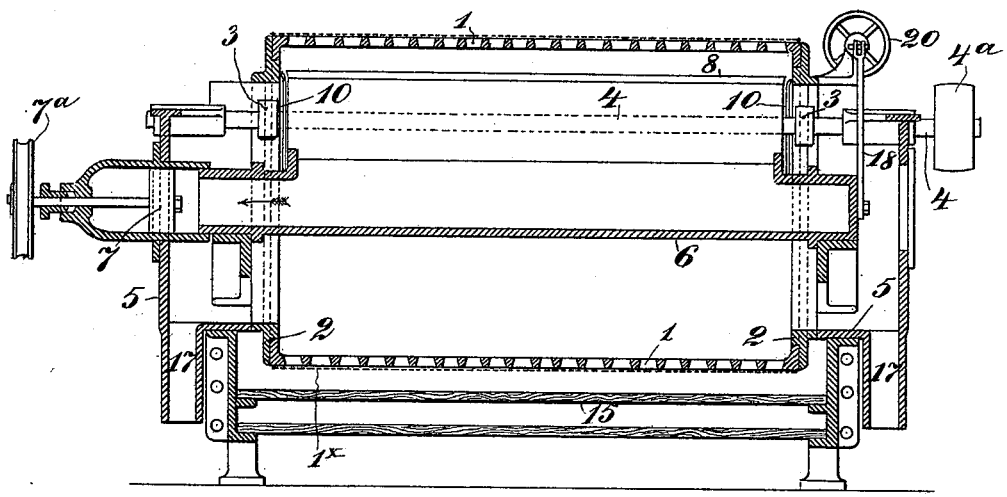
Figure 2:
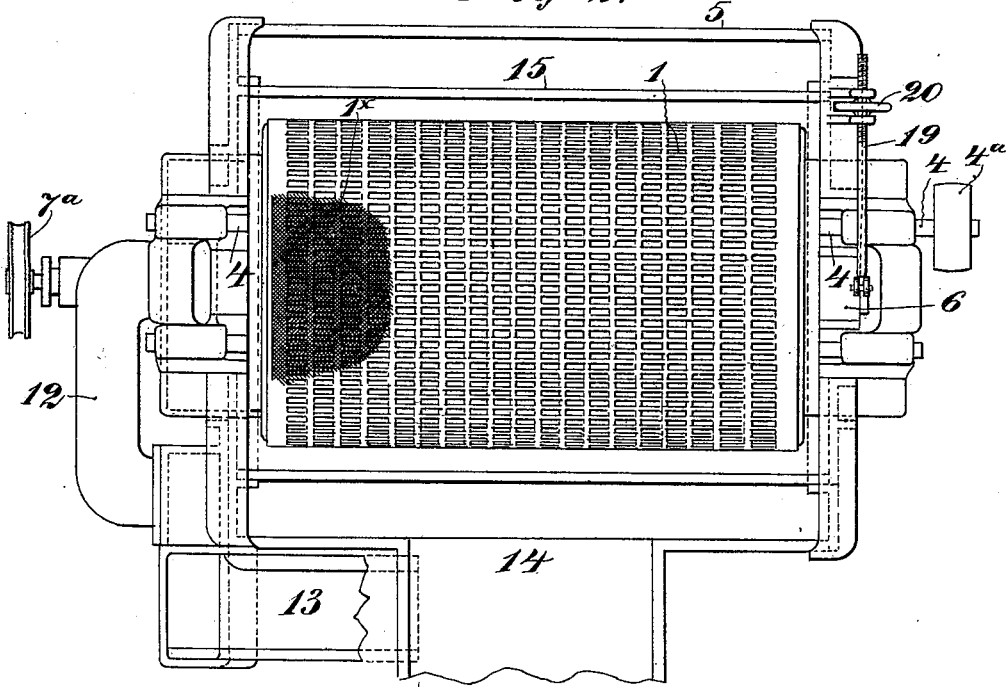

Figure 1 is a vertical longitudinal axial section of the filtering or straining apparatus. Fig. 2 is a plan of the same. Fig. 3 is an end elevation as seen from the left in Fig 1. Fig. 4 is a transverse vertical section of the filtering-cylinder and the deflector or partition 15 detached.

In a tank or liquid-holder 5 is rotatively mounted the filtering-cylinder 1. This cylinder has a foraminous or apertured peripheral surface which is covered with wire-gauze $1^\times$. Only a part of the surface of the cylinder is represented in Fig. 2 as covered with the wire-gauze, but it should be understood that the entire peripheral surface is so covered. The ends of the cylinder 1 are open, but in each open end is an annular end piece or track 2, which bears on two pairs of supporting rollers or wheels 3, fixed on shafts which extend through the cylinder and have bearings on the tank 5. One pair of wheels merely provide roller-bearings for the cylinder, but those of the other pair, mounted on the shaft 4, serve as drivers for the cylinder, the said shaft having a pulley $4^a$ on its outer end to receive a belt for driving from any source of power. The annular end pieces 2 fit snugly up to the ends of the tank 5.

Inside of the cylinder 1 and extending through it longitudinally is a trough 6, which is closed at one end—at the right in Figs. 1 and 2—and connects at the other end with a suitable pump 7, driven through a pulley $7^a$, for example.

The waste water flows to the tank 5 by way of a spout or channel 14, entering exteriorly to a curved partition or deflector 15, Figs. 3 and 4, which passes down under and about the cylinder 1 and compels the water entering the tank to pass under the cylinder and up to the opposite or rear side thereof before it can reach and enter the cylinder through its foraminous periphery.

Inside of the cylinder is a quadrant-shaped receiver 11, Figs. 1 and 4, formed by an upright plate 8 and horizontal plate 9, fixed to the trough 6, and end plates 10. This receiver fits close to the periphery of the cylinder and is, of course, normally stationary, while the cylinder rotates in the direction of the arrow in Fig. 4. Within the receiver 11 and extending lengthwise thereof is an overflow-plate 21, over which the water accumulated in the receiver flows into the trough 6.

It will be noted that the quadrant-shaped receiver 11 includes the upper rear quadrant of the cylinder and that the surface liquid flowing into the cylinder from the tank at the back will enter this receiver 11, overflow thence into the trough 6, be drawn out by the pump 7, and forced thence through the pipe 12 to a spout 13, from which it flows into the spout 14 and thence back into the tank 5 for re-straining or filtering. In Fig. 2 the dotted lines show the spout 13 discharging into the spout 14, and this is a convenient arrangement of the parts; but so long as the water from the spout 13 is led back for refiltering it is not important how it is returned. It may be carried to another filter for refiltering.

The operation of the apparatus is as follows: The waste water, charged with fiber and other impurities, flows into the tank 5 from the spout 14, passes about and under the partition 15, thence up and over the rear end of the partition, and to that portion of the slowly-rotating cylinder where the receiver 11 is situated. At this point the smaller fibers and floating particles carried by the water pass into the cylinder for the reason that the cylinder is not at this point coated with fiber and the like. As the cylinder continues to rotate it gradually becomes coated externally with a filtering layer of fibers, which transmits only water and matters in solution and holds back all solid floating matter. This filtering layer is formed by the flow of water through the immersed portion of the periphery of the cylinder. The filtered water entering the cylinder flows off through the open ends of same to outlets 17.

The fiber adhering to the surface of the cylinder as said surface emerges from the liquid is removed in the usual manner by brushes, scrapers, or the like, so that when the said surface descends into the water it is free from fiber, and hence the water which enters the drum at and near the surface at the rear end of the partition 15 will not be well or thoroughly filtered. This water will enter the receiver 11 and be pumped out for refiltration.

In order that the apparatus may operate well, the bottom plate 9 of the chamber 11 should be set deep enough below the normal level of the water in the tank 5 to insure that a filtering layer of fiber shall form on the cylinder as it moves down into the water on this side while it is traveling from the normal water-level of the tank down to the level of the plate 9, and for this reason it is preferred to mount the parts 6, 8, 9, and 10, which form the chamber 11, to turn about the axis of the cylinder 1 to a limited extent, so that the quadrant-like receiver may be shifted a little within the cylinder. To effect this adjustment, an arm 18, fixed at its lower end to the closed end of the trough 6, extends up and is coupled to a horizontally-arranged screw-threaded operating-rod 19, on which turns a wheel-nut 20, situated between stationary cheek-pieces on the tank 5. Obviously the cylinder 1 may be rotated by other means than that shown and the bottom plate 9 may be adjusted up or down by other means than that last described.

The overflow-plate 21 determines the depth of water in the receiver 11 and the difference between the level of water in tank and in said chamber 11. Preferably the plate 21 is inclined, as shown, so that its upper edge is nearly over the center of the trough 6. This is in order to maintain nearly uniform the difference of level between the water in the tank and receiver, even though the receiver may be rocked to raise or lower the bottom plate 9.

The plate 8 of the chamber 11 need not extend much above the level of the water in the tank 5, and this level must of course be above that of the water in the receiver 11. A peep-hole 22 may be provided in the end plate 10, so that the overflow-plate 21 may be examined or observed.

Having thus described my invention, I claim—

1. In a strainer or filter for the purpose specified, the combination with a tank having an inlet for the impure water, and a rotating straining-cylinder mounted in said tank and projecting above the water-level therein, of a normally stationary receiver in the cylinder for the surface water in the tank, and means for withdrawing the water from said receiver for the refiltration, substantially as set forth.

2. In a strainer or filter for the purpose specified, the combination with a tank having an inlet for the impure water, and a rotating straining-cylinder mounted in said tank and projecting above the water-level therein, of a normally stationary receiver with an adjustable bottom in the cylinder for the surface water in the tank, means for withdrawing the water from said receiver for refiltration, and means for adjusting the bottom 9 of said receiver with respect to the water-level in the tank, substantially as set forth.

3. In a strainer or filter for the purpose specified, the combination with a tank having an inlet for the impure water, and a rotating straining-cylinder mounted in said tank and projecting above the water-level therein, of a normally stationary receiver, having a trough 6, in the cylinder for the surface water in the tank, means for withdrawing the water from said receiver for refiltration, and means for rocking the trough 6 about its axis for shifting the position of said receiver within the cylinder, substantially as set forth.

4. In a strainer or filter for the purpose specified, the combination with a tank having an inlet for the impure water, and a rotating straining-cylinder mounted in said tank and projecting above the water-level therein, of a normally stationary receiver in the cylinder for the surface water in the tank, means for withdrawing the water from said receiver for refiltration, and the overflow-plate, 21, in said receiver to limit the depth of water therein, substantially as set forth.

5. In a strainer or filter for the purpose specified, the combination with the tank, the straining-cylinder rotatively mounted therein, the normally stationary receiver therein for the surface water, and the means for withdrawing the water from the said receiver for refiltration, of the inclined overflow-plate 21, the upper edge of which is situated substantially over the center line of outlet-trough of the receiver, whereby, in the different adjustments of the receiver, the level of the water in the latter may be maintained at substantially the same distance below the level of the water in the tank, substantially as set forth.

6. In a strainer or filter for the purpose described, the combination with the tank, having an inlet for the water to be filtered, and an outlet for the filtered water, of the filtering-cylinder rotatively mounted in said tank, a normally stationary receiver 11, within said cylinder and adapted to receive the surface water from the tank when it passes into the cylinder, said receiver comprising the trough 6, upright plate 8, bottom plate 9, and end plates 10, a pump for withdrawing the water from said receiver, and the overflow-plate in the receiver, substantially as set forth.

In witness whereof I have hereunto signed my name in the presence of two subscribing witnesses.

ALBERT BERGSTRÖM.

Witnesses:
ERNST SVANQVIST,
E. HERMANSSON.